US007194333B2

(12) United States Patent
Shoenfeld

(10) Patent No.: US 7,194,333 B2
(45) Date of Patent: Mar. 20, 2007

(54) PHARMACY ENVELOPE DISPENSING ARRANGEMENT

(75) Inventor: Norman A. Shoenfeld, Livingston, NJ (US)

(73) Assignee: S & S X-Ray Products, Inc., Pen Argyil, PA (US)

(*) Notice: Subject to any disclaimer, the term of this patent is extended or adjusted under 35 U.S.C. 154(b) by 231 days.

(21) Appl. No.: 10/997,152

(22) Filed: Nov. 24, 2004

(65) Prior Publication Data

US 2006/0161296 A1 Jul. 20, 2006

(51) Int. Cl.
*G06F 7/00* (2006.01)

(52) U.S. Cl. ...................... 700/243; 700/242; 700/244; 700/236; 221/2; 221/9; 221/119

(58) Field of Classification Search ................ 700/243, 700/242, 244, 231, 232, 236, 215, 216; 221/2, 221/9, 92, 119, 195, 209; 198/469.1, 470.1, 198/612, 620, 701
See application file for complete search history.

(56) References Cited

U.S. PATENT DOCUMENTS 3,537,768 A * 11/1970 Anders ....................... 312/268
3,674,155 A * 7/1972 Kessler ...................... 211/1.54
4,643,495 A * 2/1987 Pepping et al. ............. 312/268
4,650,264 A * 3/1987 Dahnert ...................... 312/268
4,813,752 A * 3/1989 Schindler .................... 312/268
4,866,255 A * 9/1989 Sing ........................... 235/385
4,877,121 A * 10/1989 Yamashita et al. ....... 198/475.1
5,039,180 A * 8/1991 Lemons ...................... 312/267
5,046,911 A * 9/1991 Ogura et al. ........... 414/331.04
5,108,163 A * 4/1992 Nakatsu ...................... 312/268
5,341,854 A * 8/1994 Zezulka et al. ................ 141/1
5,385,265 A * 1/1995 Schlamp ........................ 221/7
5,438,523 A * 8/1995 Humm et al. ............... 700/243
5,588,790 A * 12/1996 Lichti ................... 414/331.03
5,593,269 A * 1/1997 Bernard, II ............ 414/331.04
5,761,877 A * 6/1998 Quandt ........................ 53/155
5,820,237 A * 10/1998 Robey ........................ 312/268
6,170,929 B1 * 1/2001 Wilson et al. ............. 312/268
6,393,339 B1 * 5/2002 Yeadon ...................... 700/237
6,450,598 B1 * 9/2002 Hanel ......................... 312/268
6,694,217 B2 * 2/2004 Bloom ....................... 700/215
6,854,815 B1 * 2/2005 Smith ......................... 312/268

(Continued)

*Primary Examiner*—Khoi H. Tran
(74) *Attorney, Agent, or Firm*—Bernhard P. Molldrem, Jr.

(57) ABSTRACT

A prescription drug storage and dispensing arrangement allows prescriptions stored, as they are filled, in a cabinet for customer pickup. The prescriptions are placed into receptacles such as pharmacy envelopes and placed on carriers, e.g., hanger bars, that are transported on a conveyor within the cabinet. The conveyor brings one carrier at a time to an access opening for loading or retrieving of a pharmacy envelope. In one embodiment the hanger bars are rods with spaced annular recesses defining bag positions. Scissors-action arms may be used to suspend the hanger rods from the conveyor webs. The identity of each pharmacy envelope and the location of the respective bar on said conveyor and the bag position are stored in a computer, with information identifying the customer order. When the customer arrives to pick up the prescription, the customer data is entered and the conveyor automatically moves to position the respective hanger bar at the access opening. A laser and mirror arrangement can be used to identify the specific bag location. This arrangement has applications for other customer orders or merchandise. Another embodiment has carrier trays for dispensing punch cards.

22 Claims, 8 Drawing Sheets

U.S. PATENT DOCUMENTS

| | | | | |
|---|---|---|---|---|
| 6,874,684 | B1 * | 4/2005 | Denenberg et al. | 235/381 |
| 7,010,389 | B2 * | 3/2006 | Lunak et al. | 700/243 |
| 7,123,989 | B2 * | 10/2006 | Pinney et al. | 700/237 |
| 2005/0023286 | A1 * | 2/2005 | Pinney et al. | 221/123 |
| 2005/0192705 | A1 * | 9/2005 | Pinney et al. | 700/241 |

* cited by examiner

PHARMACY ENVELOPE DISPENSING ARRANGEMENT

BACKGROUND OF THE INVENTION

This invention relates to devices and techniques for dispensing prescription medications or other items that are prepared to a customer order and later to be dispensed to the customer, i.e., stored for later customer pickup. The invention is more especially directed to a medication dispensing unit which allows a pharmacist to fill prescriptions and load the filled prescriptions into the unit, and which keeps track of each of the prescription orders in the unit so each prescription can be easily retrieved when the customer arrives to pick up the filled prescription.

When a pharmacy customer, e.g., a medical or dental patient, is issued a prescription by a medical practitioner, the customer can drop the prescription off at the pharmacy or can phone the pharmacy to ask the pharmacist to fill the prescription. In some cases, the physician or other practitioner calls in the prescription to the pharmacy. The pharmacist then prepares the prescription order, i.e., places the medication(s) into appropriate containers, with labels and directions for use, and then places the filled order into a pharmacy bag or other container, which is then placed into a bin to await the customer. Typically, there are twenty-six such bins, one for each letter of the alphabet, and the orders are placed into the bin that corresponds to the customer's last name. When the customer arrives at the pharmacy counter, an employee retrieves the prescription medication from the bin and delivers it to the customer. Unfortunately, this has not been a particularly efficient means of delivery, as the medications can be mis-filed, i.e., placed into a wrong bin, and sometimes the customer's last name is misspelled, also resulting in the medication not being in the expected bin.

It would be desirable to employ a pharmacy cabinet in which the filled prescription orders can be stored securely until customer pickup, which will automatically keep track of the location of each filled order, and which will automatically find the customer's filled order for delivery. However, no such apparatus exists at present.

A similar problem exists for the film processing counter, which can be at the same drug store or the pharmacy, where exposed film is dropped and the processed film and prints are placed into alphabetic drawers or bins to await customer pickup.

Automated merchandise and order storage and tracking systems are sometimes used in some retail operations, for example, in the dry cleaning trade, where garments of numerous customers are stored on a rack, and a computer device keeps track of the locations of the garments so they can be retrieved for the customers. However, these are not readily adaptable for use in a pharmacy or similar environment.

OBJECTS AND SUMMARY OF THE INVENTION

Accordingly, it is an object of the present invention to provide a prescription dispensing arrangement that avoids the drawbacks of the prior art.

It is another object to provide a pharmacy storage and delivery arrangement that retains filled prescription orders within a cabinet and keeps track of the identity and location of each filled order so that they can be delivered efficiently to the customers.

It is still another object to provide, for use at a pharmacy, a system that automatically tracks the locations of filled prescription orders and safeguards them until delivery to the patient or other customer.

Other objects include secure storage of multiple prescription medications in a small footprint or minimal floor space; database control over the locations of these medications; fast retrieval of prescriptions; quick storage of filled prescriptions; and database providing for restocking of medications not picked up by the patient within a specified period of time.

The system can allow for bar coding to allow double-checking of prescriptions before dispensing to the customer.

In accordance with an aspect of the present invention, an automated medication dispensing system allows for customer orders, such as prescribed medication, to be stored for customer pickup, and automatically dispenses the filled customer orders when the customer later arrives to pick the order up. In this system there are pharmacy bags, e.g., polyethylene bags or envelopes with hanger handles, into which the filled customer orders are placed for storage. Other storage receptacle could be employed instead of the bags or envelopes. The automated storage and dispensing apparatus then stores, tracks, and dispenses these said pharmacy bags. This automated storage dispensing apparatus employs a cabinet or enclosure in which an access opening extends laterally across one wall. A conveyor arrangement within the cabinet defines a continuous closed loop, and carries a number of transverse horizontal hanger bars or rods. A portion of the conveyor loop extends vertically past the access opening. The hanger bars are at spaced positions on the conveyor and the conveyor controllably moves these bars in sequence to a position at the access opening. Each hanger bar has a series of spaced notches or annular recesses that define respective bag positions along the hanger bar. An automated control arrangement allows for entering the customer and prescription data, so that the identity of each pharmacy bag is stored in memory, as is the location of the respective hanger bar and bag position along the bar at which each pharmacy bag has been placed. This control arrangement also identifies open hanger positions to allow the pharmacist to insert filled pharmacy bags as the orders are filled. When the customer arrives to pick up the prescribed medication, the customer data can be entered, e.g., by swiping a customer card through a reader. The location of the corresponding pharmacy bag is found in which the filled customer order has been stored. The conveyor automatically operates to position the respective bar at the access opening for dispensing. The arrangement of the invention also employs means for identifying the associated bag position along that hanger bar to locate the pharmacy bag so that the customer order can be dispensed to the customer.

The conveyor pathway is preferably a continuous closed loop. The conveyor preferably includes a pair of drive webs, e.g., chain or belt arrangements that travel over wheels or pulleys that define the closed loop with the transverse hanger bars or rods, or other carrier means, being supported on their ends upon the drive webs. A gear drive motor drive propels the drive webs, with the gear motor drive preferably being a 90-degree gear motor disposed at a back wall or side wall of the enclosure. This arrangement is remarkably compact. The gear motor drive includes a worm gear that prevents the conveyor from being advanced by hand, so only the pharmacy bags on the one hanger bar can be accessed at a time. The drive webs may be continuous chains or may be continuous belts of a durable synthetic material, such as polyethylene, polypropylene, vinyl, reinforced vinyl, Tyvek, or another suitable material.

Preferably the hanger bars are formed as a round rods of a given diameter and each of the annular recesses is a round region of a diameter smaller than said given diameter. In a preferred mode, there may be thirty recesses, i.e., thirty bag positions, on each hanger bar.

The dispensing arrangement is favorably constructed so that the filled prescription orders are loaded into the cabinet via a load access opening on one side of the cabinet, and then are dispensed to the customers through a second, i.e., dispense access opening at the other side of the cabinet. The conveyor system moves vertically past each of the two access openings and moves the hanger bars controllably into position at the access openings for loading and dispensing.

At each of these access openings, means are provided for identifying the desired bag position on the hanger bar, i.e., for inserting the pharmacy bag upon loading, or upon dispensing for finding the pharmacy bag holding the customer's filled prescription. This arrangement can favorably feature a movable mirror that is located at the respective access opening, and which can be moved controllably in a horizontal direction across the access opening. A laser has its beam directed at the mirror, and the mirror is angled to deflect the beam towards the hanger bar. The control arrangement for the system identifies the respective bag location for loading or dispensing, and automatically moves the mirror laterally so that the beam reflected by the mirror illuminates the specific bag location associated with the given customer order. Alternatively, a fixed array of lasers or LEDs may be used for identification of the proper loading or unloading location.

An on-board processor or an associated PC or laptop can store the patient and medication information for each pharmacy bag. This provides a positive means of accounting. If a given bag is not dispensed to the customer within some pre-set time period, e.g., within 48 hours, then the processor can notify the pharmacist so that the contents can be restocked or reshelved.

The processor determines the shortest path to the hanger bar for a given pharmacy order, and moves the conveyor in one direction or the other (forward or reverse) to bring up the pharmacy bag in the shortest time. An audit trail may be kept in the processor memory to identify who has accessed any given pharmacy bag, and at what time. This can be displayed or downloaded.

The conveyor path may be designed to maximize the number of pharmacy bags for the available volume inside the cabinet or enclosure.

Upon loading or dispensing the pharmacy bags, the bar coded symbols or other readable indicia may be automatically read to ensure that the proper prescription order is at the correct location or position.

The pharmacy staff has access to any of the prescription orders, both at loading and at dispensing, without needing to stoop or bend. There may be regulated access to one hanger bar or rod at a time. A movable slot or multiple door feature can be employed to limit access to only a single pharmacy bag position at the access opening at a given time.

As one example of many possible alternative carriers or receptacles to the aforementioned pharmacy bags, trays can be employed for carrying stacks of so-called punch cards that carry a number of individual doses of a medication. The trays can be adapted to hold a number of stacks of these cards in each tray.

In another favorable embodiment, scissors action linkage arms are attached at one end to the conveyors and at the other to the hanger bars. This helps reduce spacing between the hanger bars, so that more pharmaceutical envelopes can be carried in the same dimension cabinet.

Similar apparatus may be employed for customer ordered items other than pharmaceuticals, for example, photographic film processing, as discussed before.

The above and many other objects, features, and advantages of this invention will become apparent from the ensuing description of a selected preferred embodiment, which is to be considered in connection with the accompanying Drawing.

DETAILED DESCRIPTION OF THE PREFERRED EMBODIMENT

Figure 1:
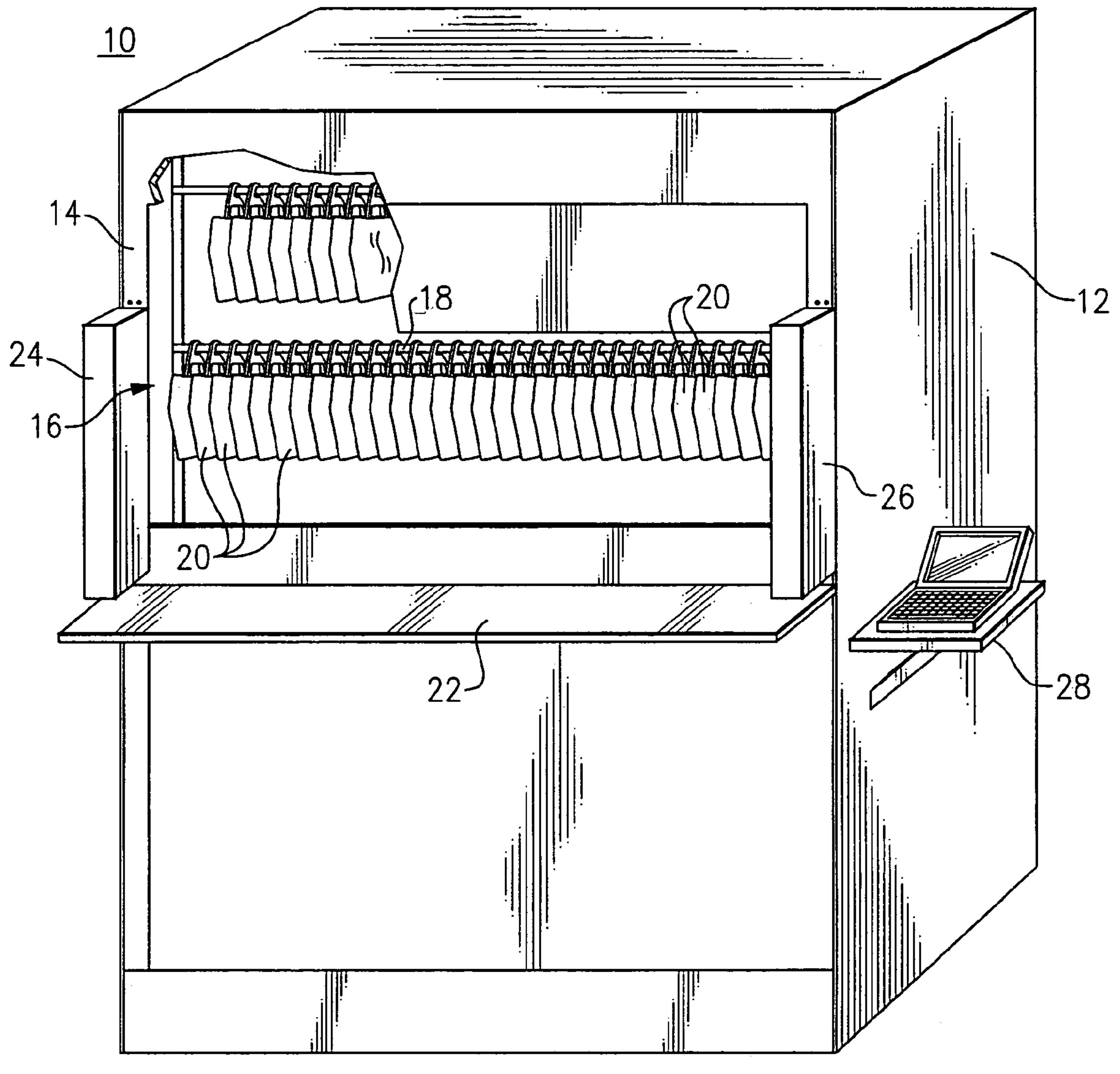
FIG. 1 is a perspective view of a prescription medication dispensing arrangement according to one preferred embodiment of this invention.
Figure 4:
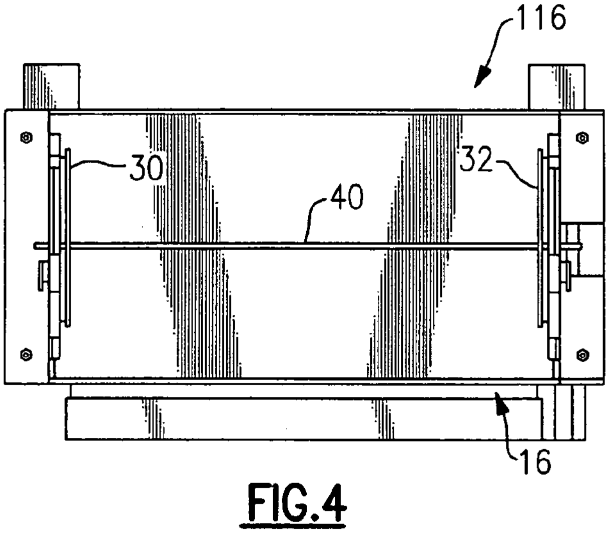
FIG. 4 is a top plan view of this embodiment.
Figure 2:
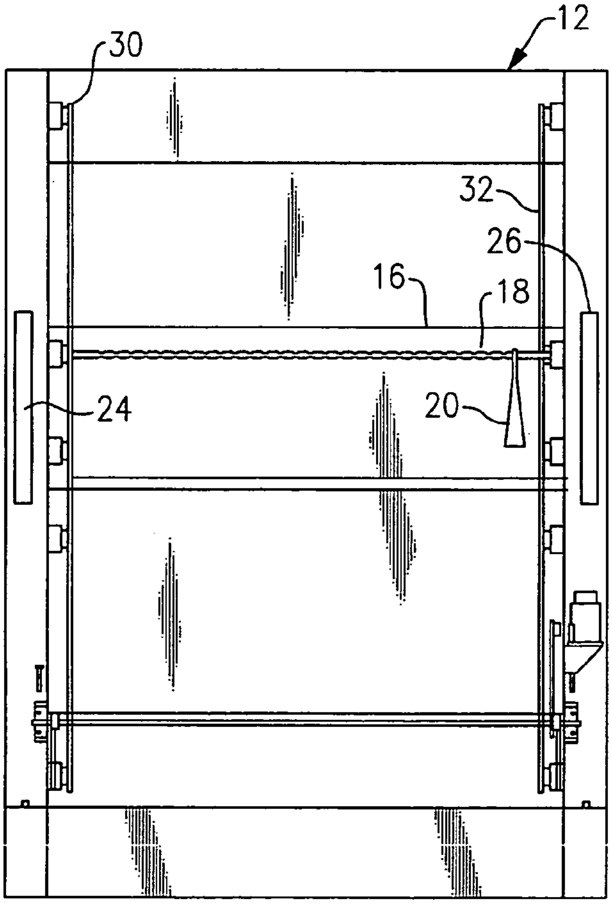
FIG. 2 is a front elevation view of this embodiment.

With reference to the Drawing, and initially to FIGS. 1 to 4, a medication dispensing arrangement 10 is configured to hold prescription drug orders as they are filled by a pharmacist and then to dispense the prescription drug orders to the customers. The dispensing arrangement of this embodiment may be employed at the pharmacy counter of a drug store, or may be used in the pharmacy department of a hospital or health center. Other embodiments employing the same general principles can be used in other commercial or service environments where there is a need to hold onto an item prepared for the customer, patient, or other recipient until it can be dispensed to the recipient. In this embodiment, the dispensing arrangement 10 has a cabinet or enclosure 12 here shown with a front wall or front panel 14, with an transverse access opening or window 16 across the front wall 14. A similar access window 116 is formed on another wall 114 at the opposite, i.e., back, side of the enclosure. On the inside of the enclosure 12 are a number of horizontal carriers, in this case transverse hanger bars or rods 18 (discussed later in reference to FIG. 5), and each rod is adapted to hold a number of pharmacy envelopes or bags 20 (discussed later in reference to FIG. 6).

A work shelf 22 is situated just below the transverse access opening 16. Also there is a light curtain provided for safety purposes, formed of a light transmitter 24 situated at the left side of the access opening 16 and a detector 26 at the right side. The transmitter emits a sheet of light across the opening 16, and the detector picks this up. Any time that a break is detected in the sheet of light, e.g., whenever a person's hand penetrates into the opening, this penetration is detected. The light curtain can be used to disable the action of the conveyor within the cabinet so that the hanger bars 18 can only move if the light screen is clear.

Here, a computer controller, e.g., a standard lap top unit 28, is supported on a shelf at one side wall of the cabinet 12, and is used for entering prescription data and customer or patient information. This computer unit 28 is connected with industry standard cabling and connections to a controller board inside the cabinet and controls the action of the conveyor on which the hanger rods or bars are supported.

Also shown here, through a cut-away portion of the front panel or wall 14 above the access opening 16, is a laser locator arrangement 100, which identifies the bag or envelope position along the hanger bar 18 where a given envelope 20 is to be placed during loading, or during dispensing where a particular pharmacy envelope 20 is hanging so that it can be identified and retrieved. This laser locator arrangement has a laser 102 emitting a laser beam horizontally, and a movable mirror 104 positioned in the laser beam and angled so as to deflect the laser beam downward and onto the hanger bar 18 that is positioned at the access opening 16. The mirror 104 is carried on a transverse track 106 and is controllably movable along the track, indexed to positions that correspond to the bag or envelope positions for the envelopes 20 along the hanger bar 18. Movement of the mirror can be carried out with a stepper motor, timing belt, and linear rail configuration. The absolute position of he movable mirror may be monitored through the use of a radial potentiometer interfaced with the timing belt. An alternative arrangement could employ a series of LEDs or laser diodes, which are generally equivalent for this purpose, each positioned above the bar 18 and directing its beam downward to a respective corresponding position along the hanger bar. A suitable control circuit would power the LEDs or laser diodes one at a time so that a corresponding one of these devices lights to point to the particular bag location. In either case, the locator arrangement produces a visible spot to identify the pharmacy bag (for dispensing to the customer) or an empty space for the pharmacy bag (for loading as the prescription orders are filled). Alternatively, LEDs can be arranged in a longitudinal array facing toward the front of the machine, i.e. towards the operator, to identify bag locations. There may be just above or just below the opening 16.

Figure 3:
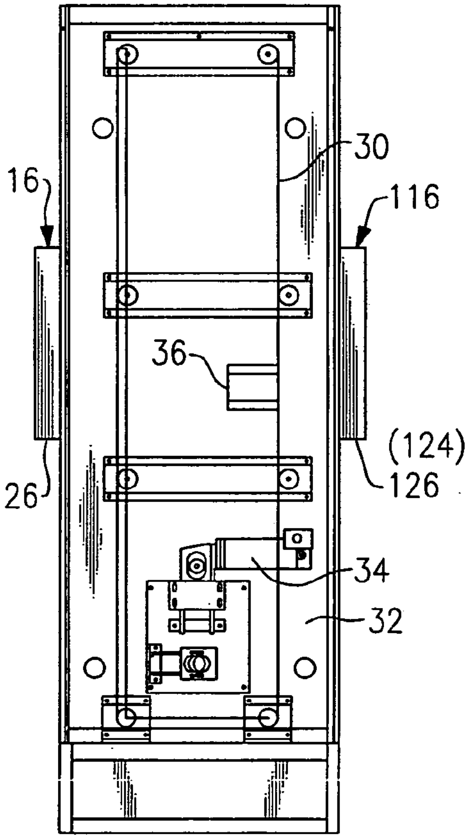
FIG. 3 is a side elevation of this embodiment

In this embodiment, there are a pair of endless web conveyors, namely, chain drives 30 and 32 disposed at the right and left of the enclosure or cabinet. As show in FIGS. 2, 3, and 4, the chain drives 30, 32 define parallel closed loop paths along the left and right walls of the cabinet. A right-angle gear motor drive 34 is situated to one side and drives both of the chain drives in a forward direction and also in a reverse direction, as required. Various sprockets and guide wheels are not shown in detail here. Because its motor is situated at a right angle to the output shaft, this gear motor 34 occupies only a small amount of space in the transverse direction. Also, the drive head of the gear motor 34 is preferably a worm gear drive, in which case the chain drive is held in position any time the motor portion thereof is not turning, so the drive chains 30, 32 cannot be pushed by hand. This precludes a user from accessing a bag that is suspended from bar located away from the access opening simply by reaching in and pulling or pushing the drive mechanism. A controller board 36, shown in FIG. 3, is electrically coupled to the gear motor 34, to the light curtain receiver(s) 26, 126, and to the computer 28, and has suitable electronics to carry out the described functions. Additional sensors, e.g., photosensors, are used for defining the exact stopping location of the hanger bars 18 at the loading and unloading openings.

Also shown in FIG. 3 is the second access opening 116 disposed on the cabinet wall opposite the first opening 16, and also guarded with a light curtain formed of a transmitter 124 and receiver or detector 126, similar to the elements 24 and 26 discussed earlier.

Figure 5:
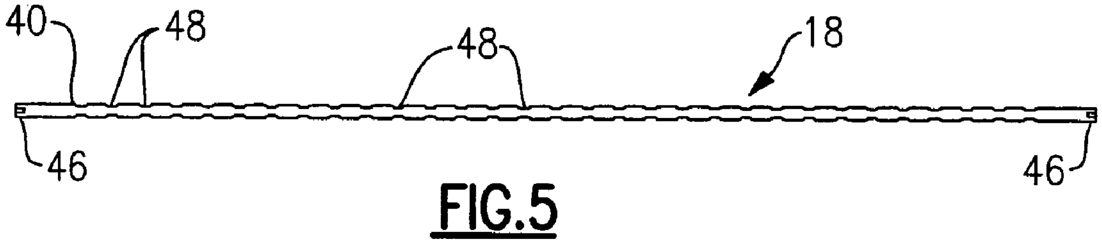
FIG. 5 shows one example of a hanger bar of this embodiment.

The hanger bar 18 of this embodiment may be a generally cylindrical rod 40 as shown in FIG. 5, with fittings 46, 46 at its ends adapted to attach to the right and left chain drives 30, 32 respectively. There are a number of spaced apart annular cutouts or recesses 48, i.e., regions that are machined out so as to have a smaller diameter. In this embodiment, there are thirty of these cutouts 48 spaced evenly along the bar. These serve to retain the handles or hooks of pharmacy envelopes or bags 20 and thus define thirty bag positions along the length of the bar. The recesses here help to keep the bags or envelopes from moving laterally on the bar. Instead of the annular recesses, the bag positions may be established using pairs of flanges that extend outward to a greater diameter than the bar or rod.

Figure 6:
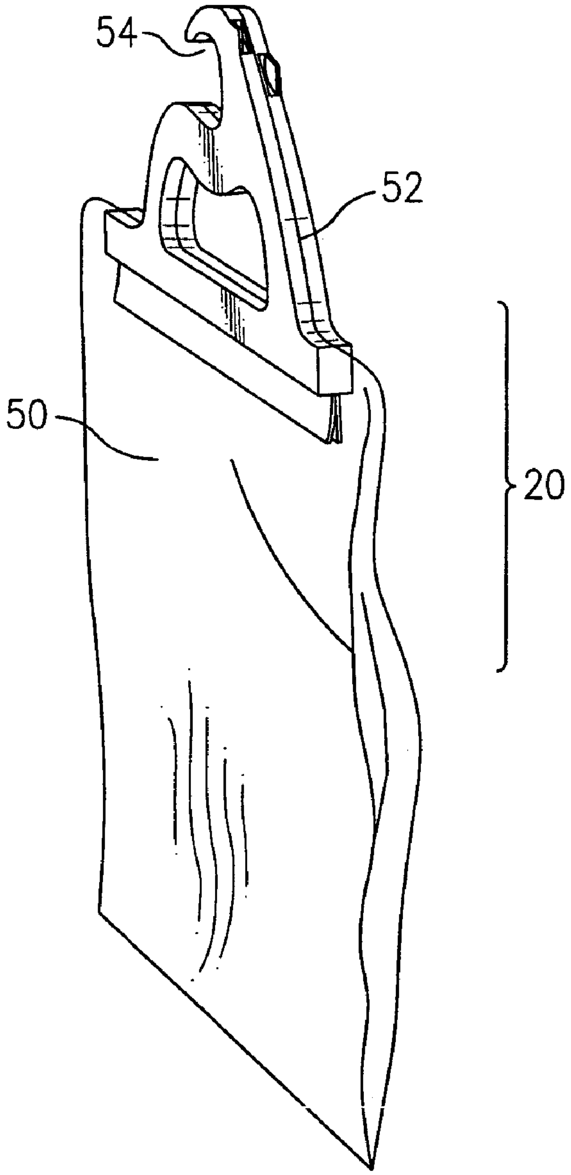
FIG. 6 is a perspective view of one of the pharmacy bags or carriers of this embodiment.

An example of the pharmacy envelope or bag 20 is shown in FIG. 6. Here, the envelope is formed of a polyethylene container 50 that opens at the top, and a two-part extruded hanger handle 52, with a hook 54 formed in it that fits into the dimensions of one of the cutouts or recesses 48 on the hanger bar rod 40. The polyethylene is preferably a transparent film so that bar coded symbols on materials packaged in the envelope 20 (such as filled prescriptions) may be read with a scanner.

Figure 7:
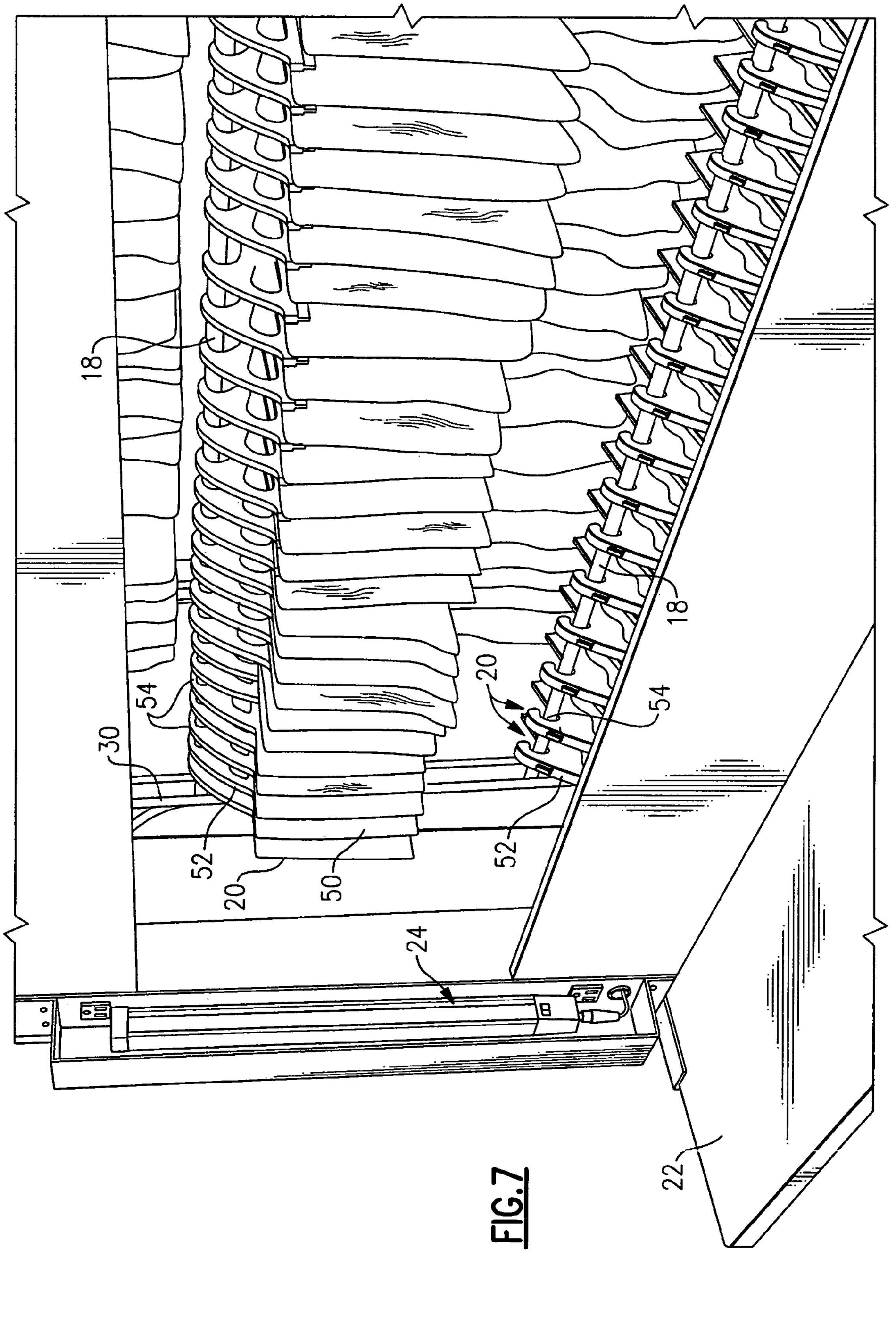
FIG. 7 is a perspective view of an access opening or window of this embodiment illustrating a plurality of the pharmacy bags placed along one of the hanger bars.

A portion of the cabinet 12 of an embodiment is shown in FIG. 7, with a row of the pharmacy envelopes 20 suspended on one of the hanger bars 18 and appearing at the access opening or window 16. Here, the conveyor has stopped with the one bar 18 and the row of envelopes at a load position or dispense position aligned with the window, and with a successive one of the bars 30 and its associated pharmacy envelopes or bags is shown just below the window inside the cabinet. The light curtain transmitter portion 24 is also shown here just to the left of the access opening.

In this embodiment, there may be ten hanger bars or rods 18 carried by the two conveyor drive webs, with each bar or rod having thirty bag positions. This creates a capacity of three hundred pharmacy envelopes. A practical arrangement of any number of pharmacy envelopes can be achieved by selecting the number or hanger bars and length of each, with the cabinet of adequate height and width.

For a photo-processing environment, the envelopes containing processed film and prints can be attached to the hanger bar by using a hook or handle that clamps onto the film processing envelope, and can be removed from the envelope when the customer picks up his or her prints and processed film.

The prescription medication dispensing arrangement 10 can be favorably employed in the pharmacy of a drug store or of a clinic. As the prescription for a given patient is filled by the pharmacist, the medications constituting that prescription are placed within a bag, box, or container, and are labeled. A bar code is included. Then, this package is placed within one of the re-usable plastic pharmacy envelopes 20, and the extruded plastic handle portion, i.e., hanger handle 52, is pushed together to close the envelope. Then the filled prescription order is ready to be placed into the cabinet. The pharmacist makes an entry into the computer 28 and this creates a signal to the controller board within the cabinet to move the conveyor along the chain path to the nearest available location for loading. This brings up one of the hanger bars 18 to the load-side opening 16, and the laser locator arrangement 100 points a spot at an open or unoccupied recess 48 along the bar. Then the pharmacist places the pharmacy envelope at this location. The computer 28 stores the customer and prescription data as well as the identity of the bar and bag location where the pharmacy envelope is stored. In some embodiments, a scanner can read the bar coded symbol off the filled prescription order, and the arrangement 10 then automatically moves the conveyor to bring up the nearest available empty location. Subsequent pharmacy envelopes are filled and loaded into the cabinet in a similar fashion.

The computer keeps track of the physical location of each filled prescription, i.e., each medication, within the cabinet. This can also be carried out, as an option, in an on-board processor on the controller board 36.

The dispensing operation is carried out when the patient or customer arrives at the pharmacy to pick up the medication. When the patient or customer arrives, his or her information is fed into the pharmacy computer. The customer may use a machine-readable card. Then the computer checks its database to find the location of the customer's prescription medications within the storage arrangement cabinet, and using this data signals to the controller board within the cabinet. This causes the conveyor mechanism to bring the appropriate hanger bar into alignment with the dispensing access opening or window 116. The laser mirror moves along above the access opening to shine a spot of light onto the pharmacy bag or envelope 20 that is carrying the customer's pharmacy order, and the pharmacy bag is removed from the cabinet. Then using the bar code, the pharmacy bag is checked against the patient's information in the computer database to ensure that the correct pharmacy order has been selected and removed (This can be done automatically within the cabinet before removing the pharmacy bag). Finally, the prescription medications are delivered to the customer.

The now-empty bag location is identified in the computer database as being available for storage of further medications.

Figure 8:
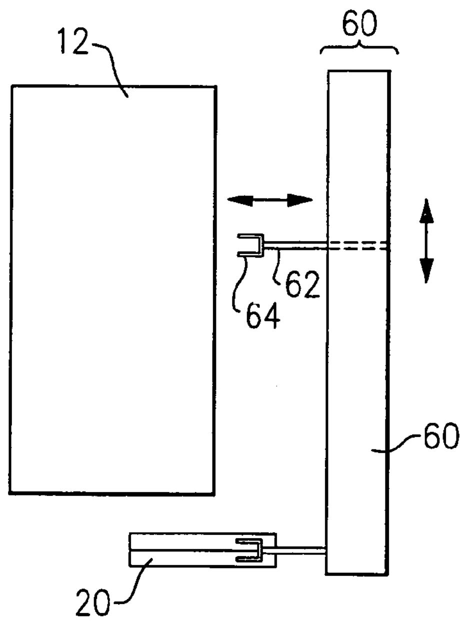
FIG. 8 is a to plan view of an alternative embodiment showing a robotic arm employed for retrieval of the pharmacy bags.

In an alternative embodiment as shown in FIG. 8, a robotic arm retrieval arrangement 60 can be used either for loading or unloading the cabinet 12. In this embodiment, as seen from above, an arm 62 having a claw 64 at its end travels from left to right under control of a transverse drive arrangement 66. This is controlled to arrive at a bag location as identified in the pharmacy computer, and then the arm 62 extends to reach into the cabinet and retrieve the appropriate pharmacy envelope. The arm 62 then retracts to remove the envelope from the cabinet, and travels to a delivery station 68 at one end of the transverse drive arrangement where the envelope 20 is made available to be dispensed to the patient or customer. There are many possible configurations for the robotic arm, this one being offered as one example. There may be two robotic arm arrangements, one for loading and one for dispensing. Alternatively, the same robotic arm may be employed for both loading and dispensing. The pharmacy bag may be placed into a slot at the front of the cabinet from which the robotic arm picks it up for placement on a hanger bar.

Figure 9:
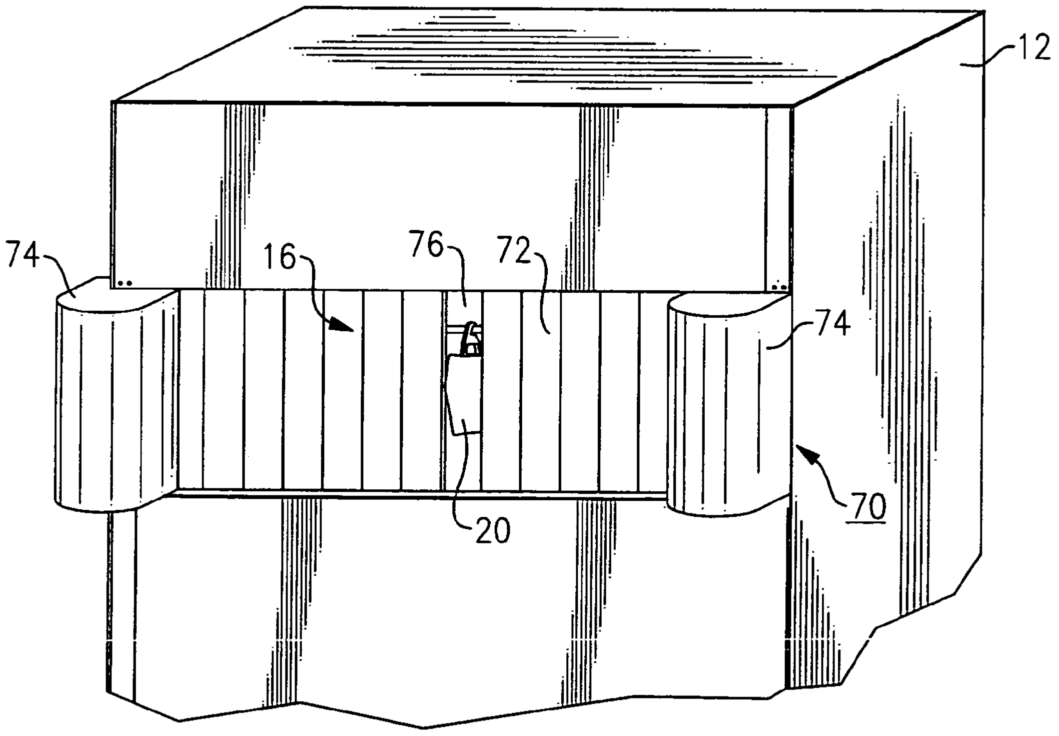
FIG. 9 is a perspective view of another embodiment, showing a movable slot for limiting access to the pharmacy bags.

In another possible modification, as shown in FIG. 9, a movable slot or door arrangement 70 may be positioned at the access opening 16 of the cabinet as a means of limiting access to a single pharmacy bag location at a time. In the illustrated arrangement, a roll-up panel 72 can be rolled up and released from left and right reel portions 74, 74 such that an slot 76 is positioned automatically at the bag location identified in the computer for a given customer or patient. This configuration may be employed for customer self-service or for other reasons where access to the pharmaceuticals must be restricted. In a variation on this, a series of doors may be positioned at the access opening, with the computer enabling only a single door at one time to be opened for dispensing. A bar code checking procedure may be employed here as an adjunct to moving the slot 76 to the bag location or enabling the door, as the case may be.

Figure 10:
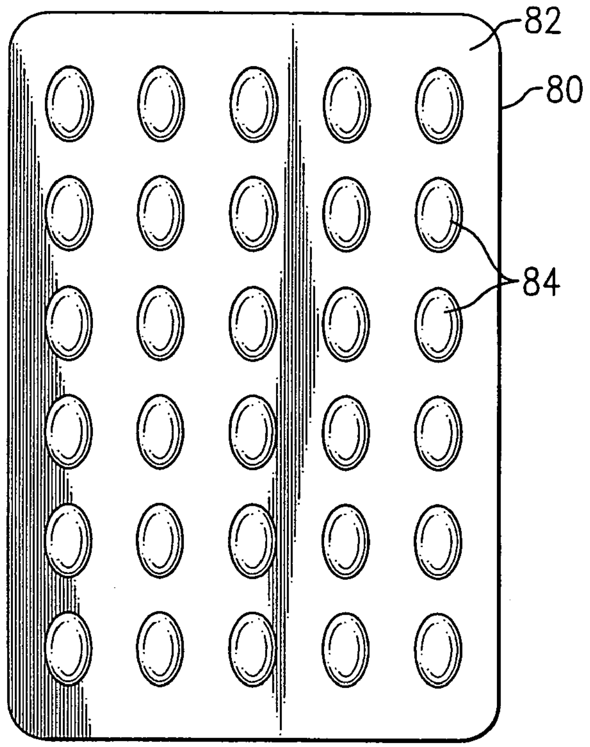
FIGS. 10 and 11 are plan and end views, respectively, that show an example of a punch card that contains a number of doses of a medication.
Figure 11:
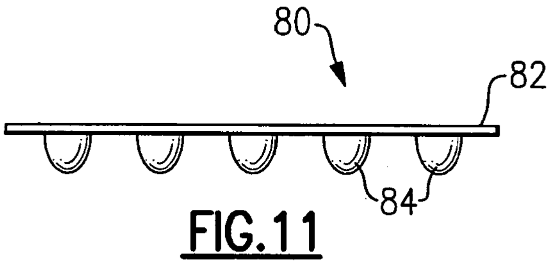

In a further embodiment, the storage and dispensing mechanism may employ a number of transport trays suspended between the two chain drives or webs 30, 32, rather than hanger bars and envelopes. These trays may be used for holding stacks of so-called punch cards 80, as shown in FIGS. 10 and 11, in which a flat card 82 has a number of pill locations 84 each defined by a clear plastic bubble on one side and a foil backing on the other. These are commonly employed for medications in which one dose is taken orally one time each day or at some other interval.

Figure 13:
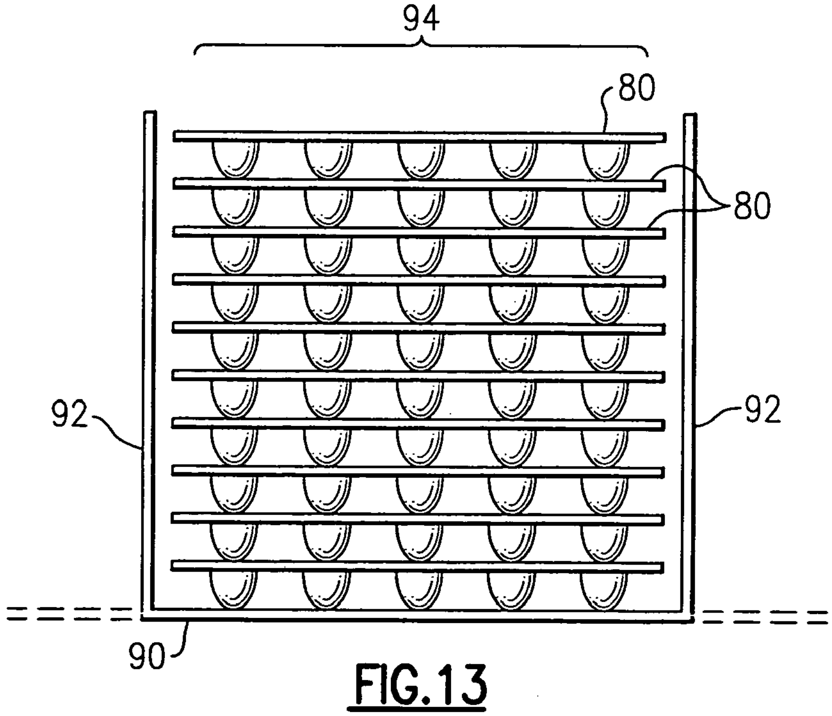
FIG. 13 is a detail elevation showing one bin of the tray.
Figure 12:
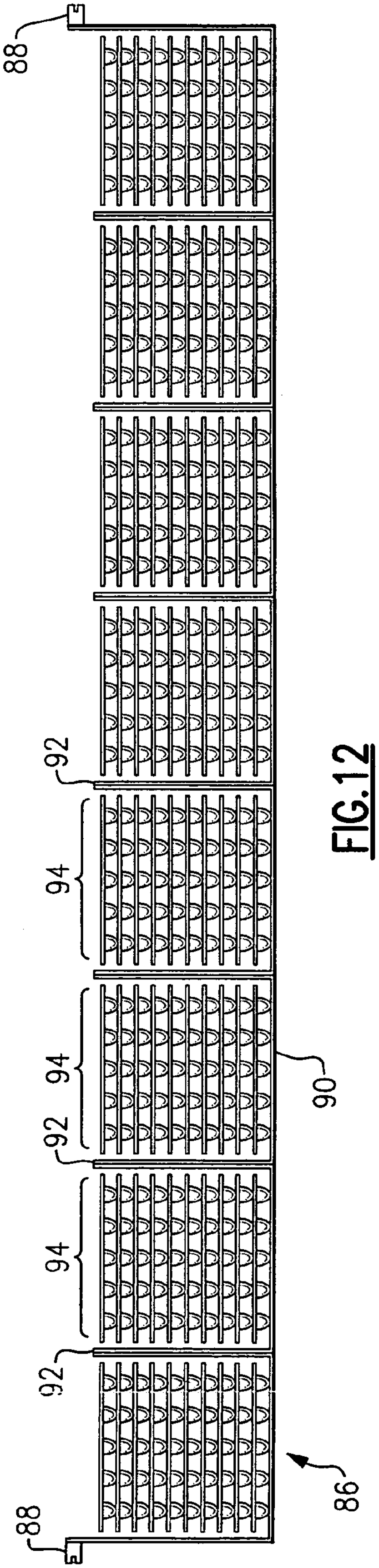
FIG. 12 is an elevation showing a tray for carrying a number of stacks of punch cards.

An example of a multiple-compartment transport tray 86 is shown in FIG. 12. The tray 86 has fittings 88, 88 at its right and left ends for attaching onto the chain drives or webs 30, 32, a flat base 90, and a number of dividers 92 that separate individual bins 94 from left to right across the tray. Each bin 94 holds a stack 96 of the punch cards 80. An example of a single bin 94 is shown in FIG. 13. In this configuration, the storage and dispensing arrangement 10 can be used for storing an inventory of many types of drugs that are contained on these flat punch cards 80, enabling the pharmacist to fill a prescription by entering the patient and prescription information into the computer, after which the conveyor system brings the tray 86 containing the appropriate stack of punch-card-packaged medication to the access opening 16. Favorably, the laser and mirror locator arrangement (or a fixed array of LEDs or lasers) will automatically identify the correct bin 94 of the tray 86.

Contact lens packages with lenses of various prescription strengths can also be stored and dispensed from an arrangement of this type.

Other possible configurations are also possible, i.e., higher or wider than the embodiments described here. Also, other carriers can be employed instead of the pharmacy envelopes 20 or the trays 86, which here serve as illustrative examples. A cabinet or similar unit incorporating the principles of this invention could be used for other dispensed items in which the access and administration should be closely controlled or to permit accountability of access. A cabinet incorporating the principles of this invention may be used for disposing CDS, DVDs, or video tapes.

Figure 14:
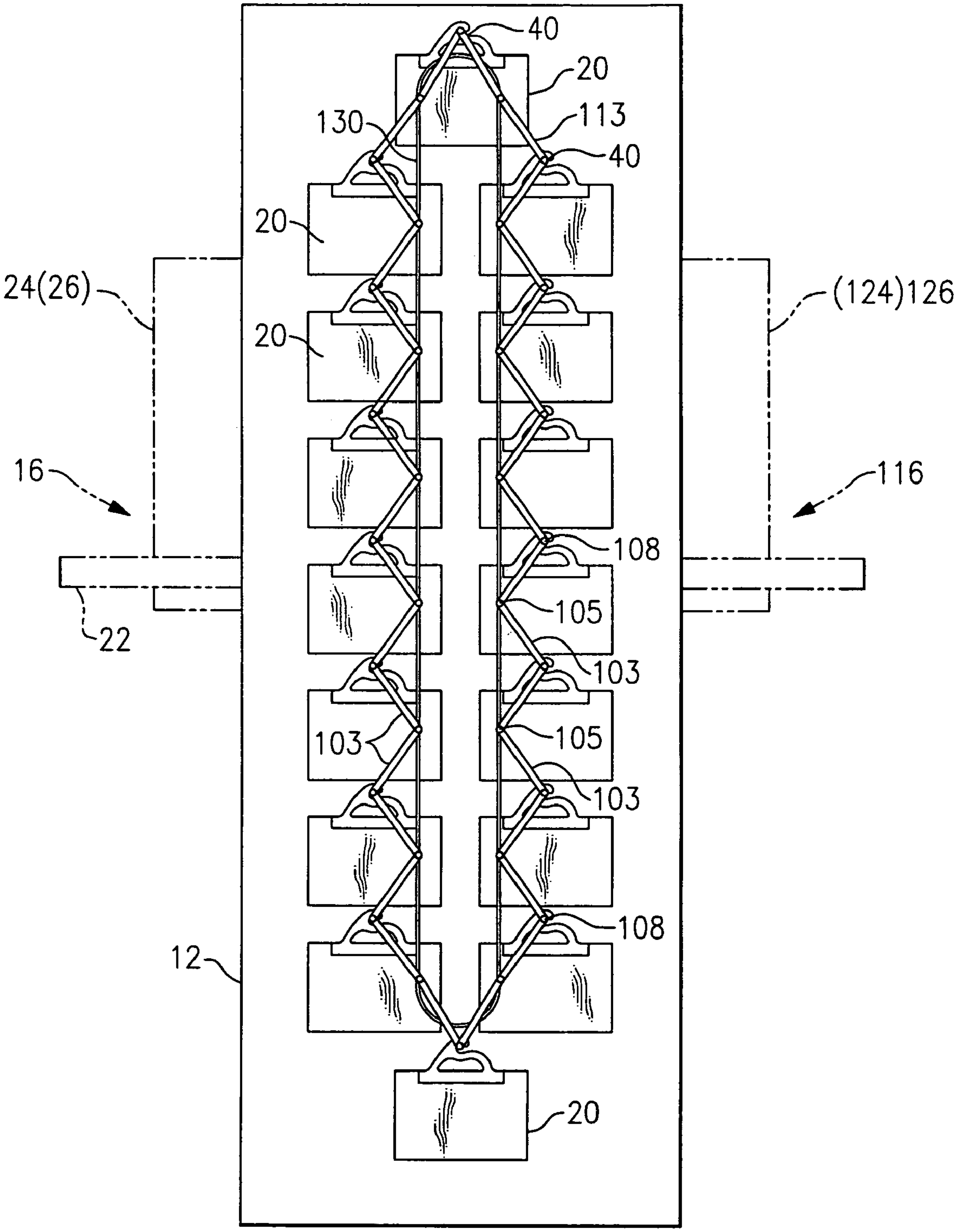
FIG. 14 is a schematic side elevation of another embodiment of this invention.

Another embodiment of this invention is illustrated in FIG. 14. Here, the cabinet 12 is constructed generally the same as in the prior embodiment(s), with the windows or access openings 16, 116, light curtain elements 24, 26, 124, 126, and shelf or shelves 22. Within the cabinet, there are a pair of continuous web conveyors, e.g., chain drives, of which one conveyor drive 130 is shown. The drive chains are arranged more central, i.e., closer to the vertical axis of the cabinet, and defining a narrow loop. Here, the hanger rods 40 are not mounted directly onto the drive chains, but are supported on pivoted, scissors action link arms 103. Each link arm 103 is mounted at one by means of a pivot 105 onto the conveyor or drive chain 130, and these are joined by another pivot 108 to a successive link arm 103 and to the end of an associated hanger rod 40. The rods preferably each have thirty milled annular recesses to define bag positions as in the prior embodiments. The drive chains are driven by a gear motor, discussed earlier and not shown here. The left and right drive chains are synchronized so they both move together. Here, the scissors action arrangement of the pivoted link arms 103 keeps the hanger bars or rods anterior to the conveyors or drive chains at the front of the cabinet, superior to the drive chains at the top, posterior to the drive chains at the rear of the cabinet, and inferior to the drive chains at the bottom. The scissors action lifts the rod 40 and pharmacy envelopes 20 up at the top and pushes them down at the bottom to create sufficient clearance so that the spacing between hanger bars or rods can be reduced along the front and rear, as shown. The total capacity of the cabinet 12 is increased, without changing the outside dimensions. The scissors-action link arm arrangement as shown here can be used to support the punch card trays and is not limited to use with hanger bars for pharmacy envelopes.

In place of the light curtains, a different type of safety interlock could be employed, e.g., a treadle based system or an ultrasonic detector system.

The cabinet can be constructed for loading and unloading or dispensing on two different levels, e.g., loaded upstairs and dispensed from downstairs, if such is desired.

The arrangement of this invention as described hereinabove has the attribute of secure storage of multiple prescription medications, and achieves this in a small footprint, requiring little additional floor space. This arrangement has database control over the exact locations of the prescription medications, and achieves both quick storage and fast retrieval of the prescriptions. Bar coding for double-checking the prescriptions before dispensing can be carried out automatically or semi-automatically. The database that identifies the stored prescriptions can also be used to identify the prescriptions not picked up by the customer within a specified time, so that the medications can be returned to inventory, i.e., restocked and reshelved.

While the invention has been described hereinabove with reference to selected preferred embodiments, it should be recognized that the invention is not limited to those precise embodiments. Rather, many modification and variations would present themselves to persons skilled in the art without departing from the scope and spirit of this invention, as defined in the appended claims.

I claim:

1. A merchandise dispensing arrangement in which customer items can be stored for customer pickup and from which the filled customer orders can later be removed, comprising a plurality of pharmacy bags into which the customer items are placed for storage; and an automated storage and dispensing apparatus for storing said items in said pharmacy bags, the automated storage dispensing apparatus including a cabinet having an access opening extending laterally across one wall of the cabinet; a conveyor within said cabinet defining a continuous closed loop, a portion of which loop extends vertically past said access opening; a plurality of hanger bars that extend horizontally at spaced positions on said conveyor such that the conveyor controllably moves said bars in sequence to a position at said access opening, each said bar having a plurality of spaced annular recesses thereon defining bag positions along said bar; automated means for storing the identity of each pharmacy bag and the location of the respective bar on said conveyor and the bag position along said bar at which said each said pharmacy bag has been placed; means for entering a customer order identification corresponding to one of said pharmacy bags in which a filled customer order has been stored; means for automatically operating said conveyor to position a respective bar at said access opening; and means identifying the respective bag position along said bar to locate such pharmacy bag so that the customer order can be delivered to a customer.

2. The dispensing arrangement according to claim 1, wherein each of said bags has a hanger handle theron adapted to seat into any of said annular recesses.

3. The dispensing arrangement according to claim 2, wherein said hanger handle is formed as a two-part member defining a closure for the pharmacy bag.

4. The dispensing arrangement according to claim 1, wherein each of said bars is formed as a round rod of a given diameter and each said annular recess is a round region of a diameter smaller than said given diameter.

5. The dispensing arrangement according to claim 1, wherein a load access opening is disposed in a second wall of said cabinet opposite the first-mentioned wall in which the access opening is located, with said conveyor controllably moving said bars in sequence past said load access opening.

6. The dispensing arrangement according to claim 1, wherein a movable mirror is located at said access opening and is horizontally controllably movable across said opening, and a laser is disposed emitting a beam aimed at said movable mirror, and said means identifying a respective bag location includes means for automatically moving said mirror so that the beam reflected by said mirror illuminates the specific bag location associated with a customer order.

7. The dispensing arrangement according to claim 1, wherein said means identifying the bag position along said bar includes a series of LEDs or laser diodes, each positioned above the carrier and directing a beam downward to a respective corresponding bag position along said bar and means for switching a respective one of said LEDs or laser diodes on one at a time to point to the respective position.

8. The dispensing arrangement according to claim 1, further comprising an access door arrangement disposed at said access opening and having a horizontally movable access slot for accessing a single bag location at a time, and means for automatically moving the slot to an identified bag location corresponding to an identified customer order.

9. The dispensing arrangement according to claim 1, further comprising a robotic arm mechanism situated at the access opening, and having an arm thereon that is movable horizontally to an identified bag location corresponding to a customer order to retrieve the associated pharmacy bag, and is further movable to a delivery location from which the bag can be removed to deliver the associated customer order to the customer.

10. The dispensing arrangement according to claim 1, further comprising a light curtain disposed at said access opening, and including a light transmitter at one side of the access opening, a receiver arrangement situated at an opposite side of said access opening to detect a break in the light generated at said light transmitter, and means for disabling said conveyor when such break is detected.

11. The dispensing arrangement according to claim 1, further comprising means for detecting the presence of an object penetrating said access opening, and means for disabling the conveyor during any time that such penetration is detected.

12. The dispensing arrangement according to claim 1, further comprising for each said hanger bar at least one pair of scissors-action link arms, each said link arm having one end pivotally supported on said conveyor and another end pivotally joined to the like end of the other link arm and also supporting the associated hanger bar.

13. A merchandise dispensing arrangement in which customer orders can be stored for customer pickup and from which the filled customer orders can later be removed, comprising a plurality of pharmacy bags into which the filled customer orders are placed for storage; and an automated storage and dispensing apparatus for storing said pharmacy bags, the automated storage dispensing apparatus including a cabinet having first and second walls disposed on opposite sides of the cabinet, an first access opening extending laterally across the first wall of the cabinet; a second access opening extending laterally across the second wall of said cabinet; a conveyor within said cabinet defining a continuous closed loop, respective portions of which loop extend vertically past said first and second access openings; a plurality of hanger bars that extend horizontally at spaced positions on said conveyor such that the conveyor controllably moves said bars in sequence to positions at said access openings, each said bar having a plurality of spaced annular recesses thereon defining bag positions along said bar; automated means for storing the identity of each pharmacy bag and the location of the respective bar and the bag position along said bar at which said each said pharmacy bag is placed; means for entering a customer order identification corresponding to one of said pharmacy bags in which a filled customer order has been stored; means for automatically operating said conveyor to position a respective bar at said access opening; and means identifying a respective bag position along the bar positioned at said first access opening on which a pharmacy bag containing a filled customer order is to be placed, and means identifying a respective bag position along said bar at said second access opening to locate such pharmacy bag so that the filled customer order can be retrieved for customer delivery.

14. The dispensing arrangement according to claim 13, in which each of said first and second access openings includes means for detecting the presence of an object penetrating the access opening, and means for disabling the conveyor during any time that such penetration is detected.

15. The dispensing arrangement according to claim 14, wherein each said means for detecting includes a light curtain in which a light transmitter is disposed at one side of the access opening, and a receiver arrangement is situated at an opposite side of said access opening to detect a break in the light generated at said light transmitter.

16. The dispensing arrangement according to claim 13, further comprising a movable mirror located at said first access opening and horizontally controllably movable across said opening, and a laser disposed to emit a beam aimed at said movable mirror, and means for automatically moving said mirror so that the beam reflected by said mirror illuminates a specific bag location at which the pharmacy bag containing an associated customer order is to be placed.

17. The dispensing arrangement according to claim 13, wherein said means identifying the bag position along said bar includes a series of LEDs or laser diodes, each positioned above the bar and directing a beam downward to a respective corresponding position along said bar, and means for switching a respective one of said LEDs or laser diodes on one at a time to point to the respective position.

18. The dispensing arrangement according to claim 13, further comprising a movable mirror located at said second access opening and horizontally controllably movable across said opening, a laser disposed to emit a beam aimed at said movable mirror, and means for automatically moving said mirror so that the beam reflected by said mirror illuminates the specific bag location associated with a customer order.

19. The dispensing arrangement according to claim 13, wherein said conveyor comprises left and right drive webs traveling in respective paths along left and right sides of said cabinet, with each of said hanger bars being supported at its ends on said left and right drive webs.

20. The dispensing arrangement according to claim 19, further comprising at ends of each said hanger bar a pair of scissors action link arms each having a first end pivotally supported on an associated one of said drive webs and a second end pivotally joined to the second end of the other of said link arms and supporting the end of said hanger bar.

21. A method of storing and dispensing pharmacy prescription orders for a plurality of respective customers in a pharmacy dispensing arrangement in which a plurality of horizontal hanger bars are supported in spaced relation on a conveyor with each bar having a plurality of spaced bag positions therealong, such that the bars travel controllably in sequence past a loading access opening in one wall of the dispensing arrangement, and past a dispensing access opening in another wall thereof, comprising the steps of filling each said prescription order, placing the filled prescription order into a pharmacy bag which is provided with a hanger, entering data identifying said filled customer prescription order into a data receiving means of said pharmacy dispensing arrangement, the arrangement automatically causing the conveyor to place one of said hanger bars at said load access opening, the arrangement then identifying an available bag position on said hanger bar; and automatically associating in memory the identity of the bar and bag position with the identity of the customer order; the method further including placing the pharmacy bag containing said filled customer prescription order onto said bar at said available bag location.

22. The method of claim 21, further comprising entering into said data receiving means information relating to a filled customer order that is stored in one of said pharmacy bags in said dispensing arrangement; the machine automatically identifying the hanger bar and the pharmacy bag location on which said pharmacy bag containing said filled customer order is stored; automatically moving said conveyor to bring such hanger bar to said dispensing access opening; automatically identifying the bag position on said bar at which said pharmacy bag is located; and removing said pharmacy bag so that the filled customer order can be delivered to the customer.

* * * * *